US008613670B2

(12) United States Patent
Hartmann et al.

(10) Patent No.: US 8,613,670 B2
(45) Date of Patent: *Dec. 24, 2013

(54) MOBILE NETWORKED GAMING SYSTEM

(75) Inventors: Andreas Hartmann, Gibraltar (GI); Michael O'Malley, Upland, CA (US); Sander Siezen, London (GB)

(73) Assignee: PartyGaming IA Limited, Hamilton (BM)

( * ) Notice: Subject to any disclaimer, the term of this patent is extended or adjusted under 35 U.S.C. 154(b) by 494 days.

This patent is subject to a terminal disclaimer.

(21) Appl. No.: 12/375,144

(22) PCT Filed: Jul. 26, 2006

(86) PCT No.: PCT/IB2006/002153

§ 371 (c)(1), (2), (4) Date: Aug. 11, 2009

(87) PCT Pub. No.: WO2008/012594

PCT Pub. Date: Jan. 31, 2008

(65) Prior Publication Data

US 2010/0022308 A1 Jan. 28, 2010

(51) Int. Cl.
*A63F 13/12* (2006.01)

(52) U.S. Cl.
USPC .................................. 463/42; 463/11; 463/29

(58) Field of Classification Search
USPC ................ 463/1, 6, 13, 19, 20, 40–42, 11, 29
See application file for complete search history.

(56) References Cited

U.S. PATENT DOCUMENTS 6,117,013 A 9/2000 Eiba
6,502,076 B1 12/2002 Smith
6,529,903 B2 3/2003 Smith et al.
6,569,013 B1 * 5/2003 Taylor ............................ 463/13

(Continued)

FOREIGN PATENT DOCUMENTS

WO WO 2006/005786 A 1/2006
WO WO 2008049871 A1 * 5/2008

OTHER PUBLICATIONS

International Searching Authority (ISA), European Patent Office, PCT/IB2006/002153, International Search Report Mailing Date Jan. 16, 2007, 2 pages.

(Continued)

*Primary Examiner* — Ronald Laneau
*Assistant Examiner* — Ross Williams
(74) *Attorney, Agent, or Firm* — Beem Patent Law Firm

(57) ABSTRACT

A mobile networked gaming system wherein a downloadable game client application connects a player to at least one game server (or wireless network), wherein the at least one game table is hosted on said game server. The game server (or wireless network) provides game operations and displays for transmission to the game client application and a display including at least one screen display including at least one lobby screen display from which a player can manually request to be seated at one or more of a plurality of virtual game positions in one or more of a plurality of multi-player or single-player games. Furthermore, a selectable automated seating option is available for automatically seating a player at one or more of a plurality of virtual game positions, wherein a player is directly seated when the player logs-in to the mobile networked gaming system. Embodiments of the present invention are disclosed as a mobile poker client application and a mobile casino client application incorporating the above features.

18 Claims, 9 Drawing Sheets

(56) References Cited

U.S. PATENT DOCUMENTS

| | | | | |
|---|---|---|---|---|
| 7,031,961 | B2 | 4/2006 | Pitkow et al. | |
| 7,033,276 | B2 * | 4/2006 | Walker et al. | 463/40 |
| 7,534,169 | B2 * | 5/2009 | Amaitis et al. | 463/39 |
| 7,742,972 | B2 * | 6/2010 | Lange et al. | 705/37 |
| 7,927,211 | B2 * | 4/2011 | Rowe et al. | 463/29 |
| 8,092,308 | B2 * | 1/2012 | Hartmann et al. | 463/42 |
| 2002/0147049 | A1 * | 10/2002 | Carter, Sr. | 463/42 |
| 2004/0152511 | A1 * | 8/2004 | Nicely et al. | 463/27 |
| 2005/0130728 | A1 * | 6/2005 | Nguyen et al. | 463/16 |
| 2006/0025221 | A1 * | 2/2006 | Jain et al. | 463/42 |
| 2006/0063590 | A1 * | 3/2006 | Abassi et al. | 463/29 |
| 2006/0287097 | A1 * | 12/2006 | Moshal | 463/42 |
| 2007/0093297 | A1 * | 4/2007 | Moshal | 463/42 |
| 2007/0191100 | A1 * | 8/2007 | Counts | 463/42 |
| 2010/0022307 | A1 * | 1/2010 | Steuer et al. | 463/42 |

OTHER PUBLICATIONS

Pokerroom.com, Mobile Games, Jun. 12, 2006, p. 1, available at http://www.pokerroom.com/mobile/ (last visited Jun. 12, 2006).

Pokerroom.com, Mobile Poker—How to Play, Jun. 12, 2006, pp. 1-3, available at http://www.pokerroom.com/games/mobile/generic/how_to.php?game_client_code=P4MO&game_client_version=1 (last visited Jun. 12, 2006).

Pokerroom.com, Mobile Poker—FAQ, Jun. 12, 2006, pp. 1-2, available at http://www.pokerroom.com/games/mobile/generic/faq.php?game_client_code=P4MO&game_client_version=1 (last visited Jun. 12, 2006).

Partymobile.com, Help/FAQs, Jun. 12, 2006, pp. 1-7, available at http://partymobile.com/help.html (last visited Jun. 12, 2006).

Osney Media Limited, The Mobile Games Forum—Brochure, Jan. 26-27, 2005, pp. 1-6, London, UK.

Holden, Windsor, Gambling on Mobile, Feb. 2005, pp. 1-5, 2nd Ed., Juniper Research Limited.

Osney Media Limited, Next Generation Mobile Games—Brochure, Aug. 30-31, 2006, pp. 1-6, London, UK.

Osney Media Limited, The Mobile Gambling Forum—Brochure, Apr. 5-6, 2005, pp. 1-6, London, UK.

Osney Media Limited, '06 Poker & Beyond: Monetising Skill-Based Games—Brochure, Sep. 13-14, 2006, pp. 1-6, London, UK.

* cited by examiner

MOBILE NETWORKED GAMING SYSTEM

CROSS-REFERENCE TO RELATED APPLICATIONS

This application claims the benefit of priority from international patent application number PCT/IB2006/002153, filed Jul. 26, 2006.

BACKGROUND OF THE INVENTION

A. Field of the Invention

The present invention is directed to a mobile networked gaming system having one or more games available to the user.

B. Description of Related Art

Several categories of networked gaming systems are well known in the prior art. A networked gaming system may be a web-based java application operable on a computer, for example, Yahoo! Games. Further, a networked gaming system may be in the form of a downloadable software application that has a unique graphical user interface (GUI) and may connect to the network via a backend of the software, for example, the PartyPoker.com client application. Even further, a networked gaming system may be in the form of a networked video game console wherein several players playing a game are connected to a network through their video came consoles (e.g. Xbox). Other categories of networked gaming systems are apparent to those persons having ordinary skill in the art.

Furthermore, a networked gaming system may be operable on a mobile phone or other wireless device. Wireless technology has evolved greatly over the past decade allowing users to download and play games on their mobile devices. Games may be downloaded to the wireless device through a wireless network. Games may also be pre-installed on the wireless device when the user purchases the wireless device. Generally, a connection to the wireless network is not required for a user to play a downloaded game because the game may be a single-player game. According to at least one research agency, the market for downloadable mobile games will grow six-fold over the five-year period 2005 to 2010. It is expected that the number of consumers using downloadable games will grow from 32 million in 2005 to 220 million in 2009.

As wireless technology advances, more games will utilize the wireless network so that multiple users connected to a wireless network may play games against one another. These types of games are generally called "multi-player" games.

Furthermore, in recent years online gaming has reached record highs, due in part to the increase in gaming options such as poker, online casino games, and online (sports) betting. Some forecasters believe that with the widespread penetration of mobile phones, poker/casino/betting trend will carry over from the PC to the wireless device.

It comes as no surprise that many companies that operate networked gaming systems on computers or elsewhere are moving forward with implementing a mobile phone version of their applications. Some of the considerations during this transition to wireless devices may include: building a profitable mobile gaming customer base, educating the consumer on mobile gaming opportunities, adjusting the game play to make the best use of the mobile format (small screens). Other considerations may include installing an accessible and time-effective customer registration process suitable for the keyboard restraints of the mobile device, creating a good user experience on the mobile device, implementing effective billing models and registration processes, encrypting transactions to ensure secure billing, or ensuring that any age verification processes are in place. Another important consideration may be to design games to suit the limitations of mobile phone technology. Besides having a relatively small screen and limited keyboard capabilities, mobile phones also have limited battery life, memory, and processing capabilities.

Some networked gaming system operators have implemented "scaled-down" mobile phone versions of their networked gaming systems. These "scaled-down" mobile phone versions generally do not offer the same gaming choices to the user as a standard PC-based networked gaming system because of the limitations of the mobile technology, including the small screen, limited keyboard, limited battery life, limited memory, and limited processing capabilities. For example, one operator offers only casino games (slots, blackjack, roulette, instant-win scratch card, etc.) on their mobile platform, but the same operator offers poker (Hold'em, 7-card stud, Omaha, etc.) in addition to casino games on their standard PC-based platform. Other operators have a casino, a poker room, and also a sports betting console on their standard PC-based platform, but offers only a sports betting console on their mobile platform. In most cases, operators do not have a poker client available on their mobile platform because it is simply too difficult to create a mobile poker client that would give the user an enjoyable experience. Even if an operator has a mobile poker client, generally this mobile client offers only a single-player poker game where the user plays against an imaginary computer-controlled player.

Because of the technical barriers, only a few networked gaming system operators have launched mobile multi-player poker clients. One of the most advanced multi-player mobile poker operators only offers "limit" poker, meaning that during each betting round a player may either "fold," "call," "bet" a pre-defined amount, or "raise" a pre-defined amount. (Limit poker, unlike no-limit poker, does not allow a user to bet/raise to any amount but limits the player to bet/raise a pre-defined amount). As mobile phones become more advanced and the users become more sophisticated, an operator that offers only one game type (i.e. "limit poker") will not endure in the marketplace.

As more game types are added to a given mobile gaming system, the user may have to navigate through multiple menus to access a game that the user intends to play. Because of the limited memory and processing capabilities of mobile phones, the mobile phone may "freeze" or time-out as the user navigates through the one or more menus as the user tries to access a game. This "freezing" problem is one of the problems with current mobile networked gaming systems. There are simply too many menus that a user must navigate to access a game, causing the mobile phone or other wireless device to freeze or timeout.

As multiple game types are added to mobile networked gaming systems, the number of games available from single operator may be very large. For example, for the game of poker there may be multiple game types (Limit Hold'em, No-Limit Hold'em, Pot-Limit Hold'em, Omaha, 7-Card Stud, Razz), multiple game styles (cash game, tournament, sit-and-go, freeroll), and multiple game stakes ("$0.05/$0.10 Limit" through "No-Limit"). Thus, there may be many variations of poker available to the user of the mobile networked gaming system.

Navigating a PC-based poker client is already very challenging for some novice users, so the added complexity of trying to navigate a myriad of choices on a mobile phone would undoubtedly turn a novice user away from the mobile gaming system. Furthermore, because of the limited memory and processing capacity of mobile phones, navigating through multiple menus to find a game may cause the mobile phone to "freeze" or time-out.

Moreover, once a user has located a game that the user would like to play (either on a PC or mobile device), and has further located the desired variation of that specific game, the user may not be able to play the game because all available player positions or tables are full for that specific variation of the game. This may be a common concern for users who like to play popular games because any available position/seat is filled almost instantly after it becomes vacant. This is a major concern for networked gaming system operators and mobile networked gaming system operators because users may become frustrated and decide not to play on that particular networked gaming system in the future. A partial solution to the seating problem is allowing users to join a "waiting list" for that specific game. Having a "waiting list" is helpful, but a waiting list is not fully effective because of its inherent deterrent effects. Some users may not want to join a waiting list because they are either impatient, are very selective about the game table they play at, or otherwise. Further, when users are waiting, they are not playing. This may cause a decrease in revenue for the networked gaming system operator or possibly a reduction in the revenue that the networked gaming system operator may earn through advertising.

Attempts have been made to alleviate some of the problems users face when trying to connect to a specific game of a networked gaming system or mobile networked gaming system. A particular PC-based poker client, not a mobile client, has a feature called "QuickSeat" that lets players bypass the lobby and choose which limit, game type, and stakes they would like to play. But, the QuickSeat feature may not fully solve the problems associated with mobile networked gaming systems having a plurality of games available to the user. First, the QuickSeat feature has only three fields by which the user may narrow the game selection process. Second, the QuickSeat feature does not automatically "buy-in" to the table (i.e. take money out of the user's account and sit at the table with that money). Once a table has been found that meets the three search criteria, the user must manually select how much money he would like to take to that table. Third, the QuickSeat feature cannot save a user's preferences and automatically seat a player at a table that meets various user-defined criteria. A player using the QuickSeat feature must re-enter his search criteria each time the user logs in to the networked gaming system.

BRIEF SUMMARY OF THE INVENTION

A mobile networked gaming system wherein a downloadable game client application connects a player to at least one game server (or wireless network), wherein the at least one game table is hosted on said game server. The game server (or wireless network) provides game operations and displays for transmission to the game client application and a display including at least one screen display including at least one lobby screen display from which a player can manually request to be seated at one or more of a plurality of virtual game positions in one or more of a plurality of multi-player or single-player games. Furthermore, a selectable automated seating option is available for automatically seating a player at one or more of a plurality of virtual game positions, wherein a player is directly seated when the player logs-in to the mobile networked gaming system. Embodiments of the present invention are disclosed as a mobile poker client application and a mobile casino client application incorporating the above features.

In one embodiment, the present invention is incorporated into a mobile networked gaming system application, such that when a user logs in to networked gaming system, the user is immediately taken to his preferred game.

These and other features and advantages are evident from the following description of the present invention, with reference to the accompanying drawings.

BRIEF DESCRIPTION OF THE SEVERAL VIEWS OF THE DRAWINGS

FIG. 2 is a diagram of an embodiment of the present invention, more specifically of a mobile device that incorporates the present invention wherein a user has logged-in.

FIG. 3 is a diagram of an embodiment of the present invention, more specifically of a mobile device that incorporates the present invention wherein a user has logged-in.

DETAILED DESCRIPTION

The description herein describes an embodiment of the present invention, wherein the invention is incorporated into a mobile phone that is connected to a wireless network. Persons having ordinary skill in the art recognize that the invention is not limited to those embodiments discussed herein.

A. Downloading the Game Client Application

There are a plurality of ways that a user may download a game client application to a user's mobile phone. First, a user may navigate the Internet on a PC to a website where the user may enter the phone number of his mobile phone. In a few moments, the user may receive an SMS (Text) Message or WAP Push on the mobile phone with a link to download the application. The user may need to select the link to download the game client application. Second, the game client application may be downloaded via SMS or text through the mobile phone. The user may text a "shortcode" to the mobile network gaming system operator with a specific message (e.g., "Poker") and then the operator may send the user a SMS Message/WAP Push with a link to download the application. The user may need to select the link to download the game. Other methods of downloading a game client application to a mobile device are also known.

B. Log-in to the Game Client Application

Figure 1:
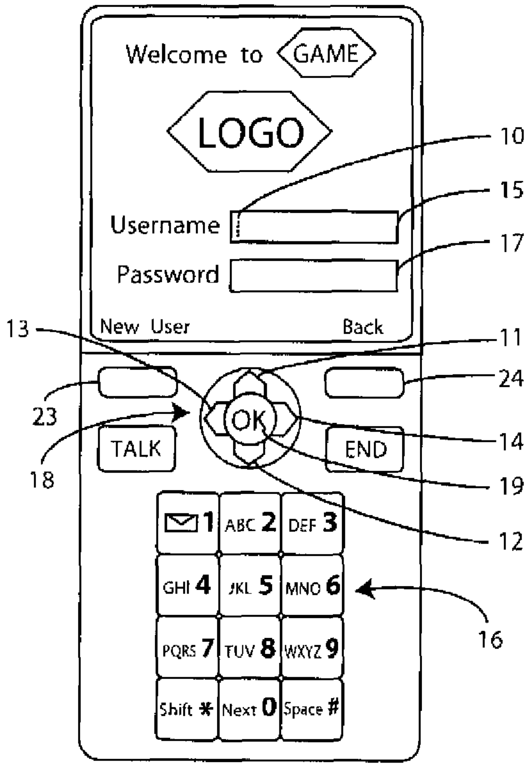
FIG. 1 is a diagram of an embodiment of the present invention, more specifically of a mobile device that incorporates the present invention.

There are several ways for a mobile game client application to become active. In one embodiment, when the mobile game client application is chosen from a list of mobile game client applications available on a mobile device, the mobile gaming application may login automatically once the user selects it. This type of auto-login option may be beneficial or convenient to a user because the user may be the only person to have access to that mobile device. In contrast, the mobile gaming application may be configured so that a user would have to manually log-in with a username and password each time the user would like to access the mobile gaming application. Referring to FIG. 1, an embodiment of a mobile phone is shown with a log-in screen displayed. Two text fields are visible, a username field 15 and a password field 17. The user may use the keypad 16 to type in a username and password specific to the user. The user may use a navigation pad 18 to move up using an up key 11, down using a down key 12, left using a left key 13, and right using a right key 14, as necessary. In the case of a log-in screen, as shown in FIG. 1, the user may use the down key 12 to move a cursor 10 down to the password field 17 from the username field 15. The user may press an OK button 19 to submit a username and password. Furthermore, if the user is a new user of this application, and does not have a username/password unique to the user, then the user may select a "New user" option by selecting a left softkey 23. This selection will take a new user through the registration process. If the user has accidentally reached to the log-in screen shown in FIG. 1, the user may select the "Back" option by selecting a right softkey 24. Furthermore, in an embodiment of the present invention, the at least one lobby screen display is accessible by the mobile game client application without a player logging-in to the mobile game client application. A user may be able to view tables without logging in, but in order for a user to play for real money or play money, the user may need to log in.

C. Navigation when Logged-in

Figure 2:
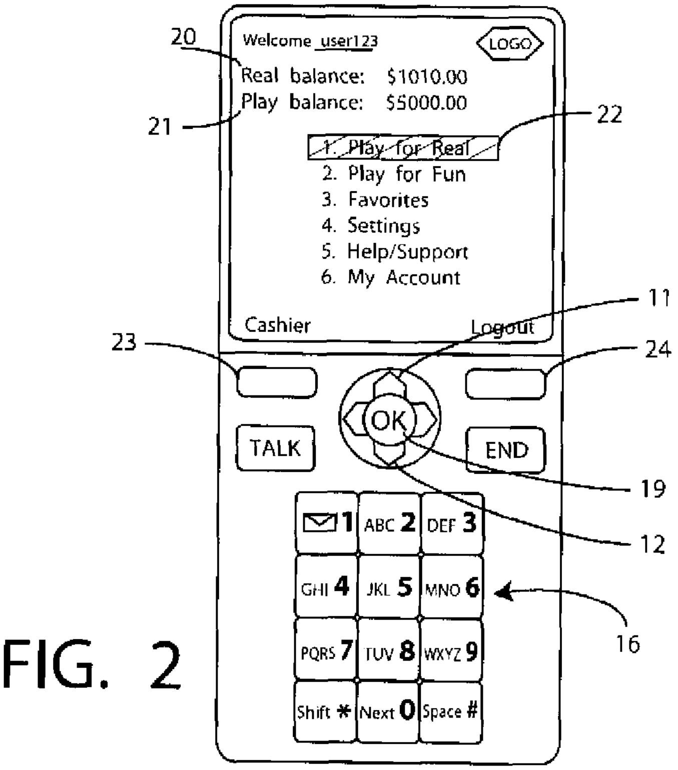

FIG. 2 is an embodiment of a screen on a mobile device when a user is logged-in to his account with a username/password unique to the user. A real balance 20 and a play balance 21 may be seen from the main screen. The real balance 20 is the total amount of real money that the user has available to take to various real money game tables. The play balance 21 is the amount of play money a user may take to a play money table. As is generally the case with most networked gambling systems, once a user exhausts all of his play money, more play money may be obtained from the game operator at no charge to the user.

A main screen, as seen in FIG. 2, may further have several selectable options available to the user. The options may be numbered so that the user may simply choose the corresponding number on the keypad 16 to select that option. For example, by selecting the number "3" on the keypad 16, the user would choose the "Favorites" option. Also, an option may be highlighted 22 and the user may use the up key 11 or the down key 12 to move the highlighted 22 option up or down. The user may select a highlighted 22 option by pressing the OK button 19. Other options may also be available to the user by pressing "softkey buttons." A left softkey 23 and a right softkey 24 may be available. By selecting a softkey, a user selects the option that is visible directly above the softkey. As seen in FIG. 2, selecting the left softkey will choose the "Cashier" option, while selecting the right softkey 24 will select the "Logout" option.

1. Options—Overview

Figure 3:
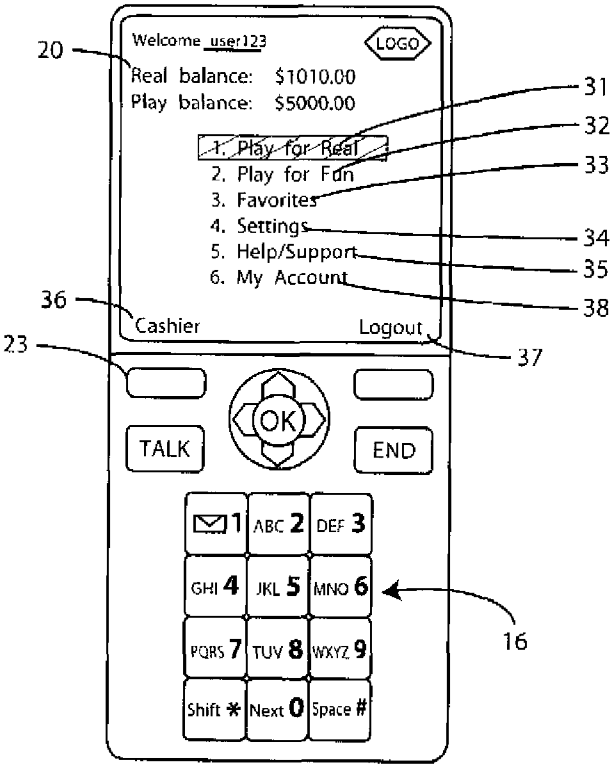

There may be several options available to a user once logged in. As seen in FIG. 3, may be a "Play for Real" option 31, a "Play for Fun" option 32, a Favorites option 33, a Settings option 34, a Help/Support option 35, a Cashier option 36, a Logout option 37, or a My Account option 38. Other options that may be available to a user would be known to persons having ordinary skill in the art. For example, if a mobile networked gaming operator operates several different game client applications (i.e. a poker client, a casino client, a backgammon client) then there may be selectable options available to the user of any of these client applications that "links" the user directly to other client applications operated by the mobile networked gaming system operator.

A "Favorites" option 33 allows users to set up a favorite games list and have quick access to these games. This feature will be discussed in depth later.

Selecting a "Settings" option 34 may take the user to another screen, from which a user may choose various game client application settings.

Selecting a "Help/Support" option 35 may open a new screen from which a user may get help or support for the game client application. Also it may provide frequently asked questions (FAQs) that may help the user with problems.

A "Logout" option 37 facilitates logging out of the system.

Selecting the Cashier option 36 may take the user to a new screen where the user may cash-out (withdraw) money from his real balance 20, or may deposit more money into his real balance 20. To deposit money, a user may need to access a third party client to facilitate a transfer of funds from a credit card, debit card, bank account, or otherwise as is well known to those having ordinary skill in the art.

Selecting a My Account option 38 may take a user to another screen from which a user may change his account specific options and see all account specific information.

Selecting a "Play for Real" option 31 may take the user to a new screen from which the user may access "real money" games.

Selecting a "Play for Fun" option 32 may take the user to a new screen from which the user may access "play money" games.

2. Options—My Account

Figure 4:
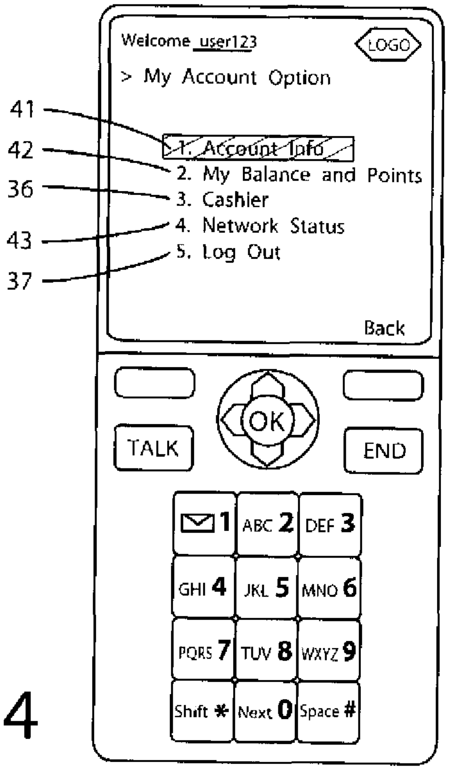
FIG. 4 is a diagram of an embodiment of the present invention, more specifically of a mobile device that incorporates the present invention wherein a user has logged-in and accessed a "My Account" option.

As seen in FIG. 4, selecting a My Account option 38, may take a user to another screen from which account-specific features are available. The screen may have selectable options, like, for example, Account Info 41, My Balance and Points 42, Cashier 36, Network Status 43, Log Out 43, or other options that would be obvious to those having ordinary skill in the art.

An "Account Info" option 41 may open a screen to a login page to view or edit account settings. If the user is already logged-in, as shown in FIG. 4, selecting the Account Info option 41 would take a user directly to the appropriate page.

A "My Balance and Points" option 42 may open a screen an account balance page.

A "Cashier" option 36 may open a new screen to the account cashier page. This may be the same screen accessible directly from the main screen via the left softkey 23 as seen in FIG. 3.

A "Network Status" option 43 may check the status or strength of a user's mobile network connection.

A Logout option 37 may log a user out of the mobile networked game client application. If the user is already logged out, the Logout option 37 may change to a Log-in option.

3. Options—Settings

Referring to FIG. 3, a "Settings" option 34, when selected, may open up a new screen that allows a user to manage his settings. It may include the following areas. On/off sections may be represented by checkboxes.

3.1. Startup and Login
3.1.1. Automatic login at start (on/off)
3.2. Sounds
3.2.1. Turn all Sounds (on/off)
3.2.2. Turn Alert sound (on/off)
3.2.3. Turn Info sound (on/off)
3.2.4. Turn Error sound (on/off)
3.3. Alerts
3.3.1. Turn all Alerts (on/off)
3.3.1.1. All following items are graphically subordinated to this one.
3.3.2. News & Events (on/off)
3.3.3. Bonus offers/promotions for you (on/off)
3.3.4. Reminders (cannot be turn off, as only coming when requested by you)
3.4. Sections:
3.4.1. Poker Lobby
3.4.2. Casino Lobby
3.4.3. Backgammon Lobby
3.4.4. News & Events
3.4.5. My Account (cannot be turned off)
3.5. Reminder
3.5.1. First reminder: [60] minutes before tournament start
3.5.2. Second reminder: [30] minutes before tournament start
3.5.3. Third reminder: [15] minutes before tournament start
3.5.4. Keep third reminder in front of monitor (on/off)
3.5.4.1. By default this feature is on.
3.5.4.2. This feature requires the desktop alert being active until user clicks it away or goes to the tournament lobby.
3.6. Get Latest Update
3.6.1. Manually requested update starting visible updating process of new window with updating status bar and displaying steps of updates 4. Options—Help/Support As seen in FIG. 3, a Help/Support option 35 may be available. The following is an embodiment of a list of selectable options available to a user who selects a Help/Support option 35 (parenthetical notes may not be visible to a user).

4.1 "Send PartyMessenger to a friend" (opens email with text already added in)
4.2 "Help" (link to help page)
4.3 "Messenger FAQs"
4.4 "Legal Info & Security"
4.4.1 "Security"
4.4.2 "Your Privacy"
4.4.3 "Licensed & Regulated"
4.5 "About Us"
4.5.1 "Legal Information"
4.5.2 "Privacy"
4.5.3 "Responsible Gaming"
4.6 "System info" (opens same info as on the current client)
4.7 "Version" (opens same info as on the current client)

5. Options—Favorites

The thrust of the present invention consists in extending in data depth and functionality a standard favorites menu. As seen in FIG. 3, a user may select a Favorites option 33 that may open a new screen from which the user may set his favorites. Recall that a mobile networked gaming system operator may operate various mobile game client applications. Thus, favorites may be vertical-independent, i.e. a user can have multiple favorites from various game client applications, each of which is operated by the same mobile networked gaming system operator. Favorites may be included on an account-level, meaning that a user may set personal favorites. For advanced systems, the mobile networked gaming system, along with the mobile game client application, may suggest favorites to the user based on player game history. An automated seating option (or "AutoSeat") of said mobile game client application is further selectable by the mobile networked gaming system, whereby personal gaming history, including but not limited to a game category, a specific game type, stakes, or an amount of money that a player commonly plays, may be recorded by the mobile networked gaming system and a player may be taken directly to a table, upon logging into the system, in accordance with the recorded personal gaming history of a player. Furthermore, based on the personal gaming history of a player, some amount of money may be taken from a player's account when seating a player, such that the player is seated with said amount of money usable for game play.

The Favorites option 33 may cover three types of favorites: category favorites, direct favorites, and AutoSeat favorites. Each of the three types requires different handling in functionality and representation.

5.1. Category Favorites

Category favorites are those of the type where a further selection by the user is still necessary before being able to access a game. When selecting a category, the proper brand-specific mobile game client application lobby may open up in the messaging program and the according sub-category opened. For example, if the user selects the category favorite "Slots," then the Casino lobby opens (if not already open) and the category slots expands. The user may still need to select which game to play from a general category like "Slots". Category favorites may be convenient for a user who enjoys playing various games located on various mobile game client applications, each of which is operated by the same mobile networked gaming system operator.

5.2. Direct Favorites

Direct favorites are those of the type where a specific game can be directly accessed (not simply a category of games) and no additional refinement or action has to be done by the user. When clicking on a direct favorite, the user will directly be sent to the according game. The buy-in window opens and the user can buy in and sit down. All standard logic when accessing a table will be applied (e.g. if insufficient funds, then user will be prompted to go to cashier). For example if the user selects the direct favorite "Poker Cash Games Cash>Pot-Limit Omaha>$0.10/0.25 PL," then the user will be automatically taken to a poker cash game, pot-limit Omaha where the "blinds" are $0.10 and $0.25. The user chooses the amount of his "buy-in" and sits down and may begin playing.

5.3. AutoSeat Favorites

A mobile networked gaming system may include an automated seating option (or "AutoSeat" feature") of said mobile game client application capable of receiving and storing personal preference information, including but not limited to a game category, a specific game type, stakes, and an amount of money to be taken from a player's account when seating a player, and for seating a player at a table in accordance with said stored personal preference information. AutoSeat favorites are those of the type where the user has selected an AutoSeat option and also provided some more information, and is then automatically seated and "bought-in" when the user chooses this option. For example, if a user has the AutoSeat option selected on a No-Limit Hold'em table, having blinds of $1/$2, and a user buy-in of $200, then once the user signs on he will automatically be taken to a No-Limit Hold'em table, having blinds of $1/$2 and the user will be bought-in for $200 automatically. A goal of the AutoSeat functionality is to get users seated more quickly on a table. Furthermore, the AutoSeat feature is meant to ease some of the burdens created by gaming applications on mobile devices. For example, the user may normally have to navigate through a plurality of screens before sitting at a game table. This processing-intensive navigation may take a considerable amount of time to complete, or may cause the mobile device to freeze or time-out.

The AutoSeat feature may be chosen automatically by the system using hand history, saved settings, or an automated procedure using certain assumptions. When the AutoSeat feature is chosen automatically by the system, some amount of money (calculated by the system based on personal gaming history) may be taken from the user's account when the player is seated at a table.

Figure 6:
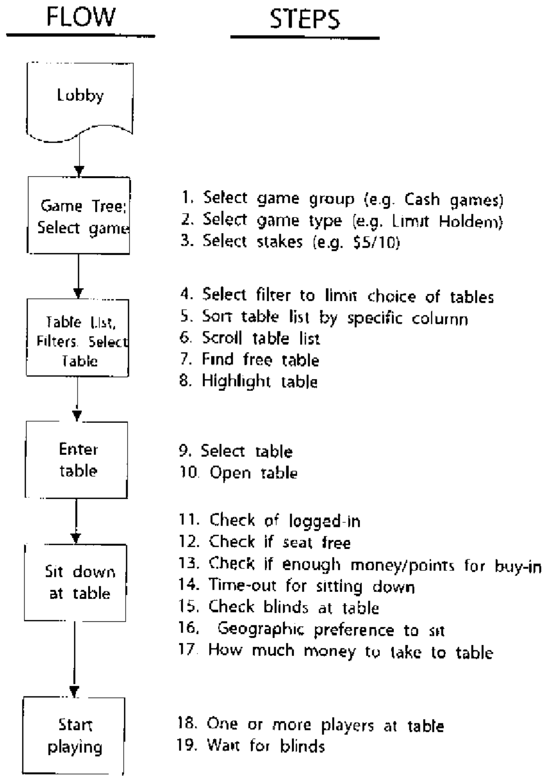
FIG. 6 is a flowchart of the typical steps a user takes to sit at a game table.

Also, the AutoSeat feature may be manually selected by a user. Referring to FIG. 6, there are approximately nineteen steps required to open a gaming application and sit at a table with cash. The approximately nineteen steps may include: 1. Select game group (e.g. Cash games), 2. Select game type (e.g. Limit Holdem), 3. Select stakes (e.g. $5/10), 4. Select filter to limit choice of tables, 5. Sort table list by specific column, 6. Scroll table list, 7. Find free table, 8. Highlight table, 9. Select table, 10. Open table, 11. Check of logged-in, 12. Check if seat free, 13. Check if enough money/points for buy-in, 14. Time-out for sitting down, 15. Check blinds at table, 16. Geographic preference to sit, 17. How much money to take to table, 18. One or more players at table, and 19. Wait for blinds. In contrast to the nineteen step process described herein and depicted in FIG. 6, the AutoSeat feature allows for seating at a table using only one step: signing on.

The main motivators for the AutoSeat feature are to (1) assist users in getting a table of their choice in a large, dynamic, and quickly moving data set of tables or games, (2) make the seating process more convenient for user, (3) use history and stored information to overcome ambiguous situations on the way to getting seated, (4) apply the service to a number of frontends/interfaces from which the user might be accessing the networked gaming system, (5) and seat a player at a table while putting a relatively small burden on a mobile device's limited memory and processing capabilities.

The AutoSeat feature may be either backend- or frontend-driven. The best case is a mixture with backend storing the user's preferences and the frontend executing the query through the application programming interface.

Figure 5:
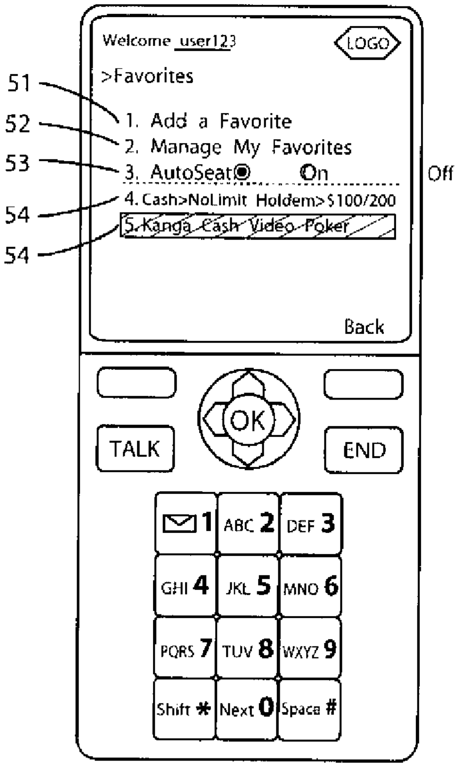
FIG. 5 is a diagram of an embodiment of the present invention, more specifically of a mobile device that incorporates the present invention wherein a user has logged-in and accessed a "Favorites" option.

In accordance with the above description, once a user has chosen a Favorites option 33, as seen in FIG. 3, a new screen may be displayed from which the user may select and manage favorites. FIG. 5 is an embodiment of a new screen that opens when a user selects a Favorites option 33.

Naming conventions may be used to identify favorites. The following are examples of naming conventions and structures that may be taken for poker and casino games:

Poker Cash Games: Cash>Pot-Limit Omaha>$0.10/0.25 PL
Poker Jackpot Tables: Holdem>Bad Beat Jackpot>$15/30
Poker Tournaments Tournaments>Regular
Poker Sit&Gos: Sit&Go's>Steps>2-Table Steps
Poker Play Money Games: Play>Pot-Limit Hold'em>50/100 PL
Casino: Cash Cruise Slots, Kanga Cash Video Poker The structure of the favorites menu may be either in a one-level list, or as a multiple-level (i.e. sub-levels) list. FIG. 5 shows a favorites list as a one-level list. Several choices may be available from this favorites menu. There may be an "Add a Favorite" option 51, a "Manage My Favorites" option 52, an AutoSeat On/Off option 53, and zero or more selectable favorites 54.

When opening the mobile gaming application, the favorites associated with a user's account are read from the existing favorites list of the user. If no favorites exist, the favorites list may be empty. If the Autoseat On/Off option 53 is set to "On," then the user will be automatically seated at a table corresponding to an AutoSeat favorite. Since favorites may be stored across brand-specific client applications (distinct game client applications operated by the same mobile networked gaming system operator), favorites may be added from each brand-specific client application. If upon attempted addition of a favorite it is discovered that it already exists as a favorite, then the existing favorite may just be over-written.

In the case of adding a favorite, especially an AutoSeat favorite, upon choosing an "Add a Favorite" option 51, a separate screen may open up where the user may select more criteria. In order to ensure that the table/seat that the AutoSeat feature selects is to the user's liking, more search criteria may be selected in addition to simply selecting the game type and stakes. Some of the possible narrowing criteria may be: Game group (e.g. Cash Games, Jackpot Tables, Sit&Go, and Play for Free), Game Type (e.g. NL Holdem, Limit Holdem . . . ), Stakes (e.g. 5/10, 10/20 . . . ), Seats at Table (2, 6, 10), Players at table (e.g. Number=X, X or more, X or less), Waiting (Waitlist OK, Waitlist not OK), Hands per hour (e.g. Number=X, X or more, X or less), Average pot (e.g. Number=X, X or more, X or less), or Buy-in (Min. buy-in, Normal buy-in, Full balance).

AutoSeat favorites automatically select a game table for the user, open it up, buy-in, and sit the player down. AutoSeat is a direct favorite with additional data and procedures to directly sit down on a table and "buy-in." The logic of table selection in the AutoSeat feature may be taken and modified from the existing Waitlist functionality.

Figure 7:
FIG. 7 is a flowchart of the typical steps a system takes to automatically sit a user at a game table.

Referring to FIG. 7, after choosing a Direct or AutoSeat Favorite, the process of seating a player follows the sequence: Connected 71→Tables available 72→Free tables available 73→Buy-in 74→Sit Down 75.

If the mobile networked gaming system or wireless connection 71 is not operational, then the standard error popup will be displayed in case a user loses connection.

If currently no tables are available 72 in the selected game type/stake combination (e.g. No-Limit Hold'em $5/10), a popup will come up telling the user "There are currently no tables available in [GAME TYPE]/[STAKE]. Please try other [GAME TYPE] tables." When clicking on the OK button, the popup closes and the user will be taken to the [GAME TYPE] category, which includes tables from all stakes. [GAME TYPE]/[STAKE] combinations are applicable for live games and Sit&Go's (which use Buy-ins).

If currently no tables are available 61 in the selected game group (e.g. Cash Games), a popup will come up telling the user "There are currently no tables available in [GAME GROUP 1]. Please try [GAME GROUP 2]." with [GAME GROUP 1] being the game group he is looking for and [GAME GROUP 2] being the other available game group (game groups are Cash and Play). When clicking on the OK button, the popup closes. The user will stay in his current lobby selection.

Refining criteria can be used to filter for a table of choice. Independent of the game type or stake, these filters may have special behaviors if no table is found with the exact criteria.

For the refiner "Average Pot Size," the criteria may be: "X or more" or "X or less." If the selected average pot restriction does not retrieve any tables, but tables with other values are available, a popup may come up saying "We did not find any tables with avg. pot [SELECTED VALUE] or [SELECTED CONDITION, LESS OR MORE]. However we found similar tables with different avg. pot values. Please repeat your search again after a few seconds, or take a look at the other tables we found." Clicking on "Try again" may trigger another lookup for the exact criteria again. "View other tables" will just open the according game types/lobby and let the user manually go through the tables.

A refiner for Sit-and-Go tournaments is the buy-in amount. If the selected buy-in value does not retrieve any tables, but tables with other values are available, a popup will come up saying, "We did not find any tables with a [BUY-IN] buy-in, however we found similar tables with different buy-ins. Please repeat your search again after a few seconds, or take a look at the other tables we found." Clicking on "Try again" may trigger another lookup for the exact criteria again. "View other tables" will just open the according game types/lobby and let the user manually go through the tables.

For the refiner "Hands per hour," the criteria may be: "Number=X," "X or more," or "X or less." If the selected hands per hour restriction does not retrieve any tables, but tables with other values are available, a popup will come up saying "We did not find any tables with avg. pot [SELECTED VALUE] or [SELECTED CONDITION, LESS OR MORE]. However we found similar tables with different hands per hour values. Please repeat your search again after a few seconds, or take a look at the other tables we found." Clicking on "Try again" will trigger another lookup for the exact criteria again. "View other tables" will just open the according game types/lobby and let the user manually go through the tables.

Similar messages to those above may pop up if other search criteria are not met, but similar tables are available. Also, if the user uses a combination of criteria for auto-seating and does not get any tables, the system may loosen the above criteria one by one in a pre-defined order and check again for availability.

A differentiation in handling a search for free tables 73 will be required for users which are willing to be put on a wait list and users who do not. This preference may be set when adding/changing a favorite. The following Table 1 lists possible scenarios based on the assumption that the system does not find any free table based on the selections done. As mentioned above [STAKE] can be understood as stake, blinds or buy-in, depending on game type.

TABLE 1

| Use Case/Criteria | Behavior with Waitlist on | Behavior without Waitlist |
|---|---|---|
| [GAME TYPE]/[STAKE] combination, e.g. Limit Hold'em $5/10 | If all [GAME TYPE]/ [STAKE] tables are full, the system picks the table with the shortest waitlist, opens it and automatically signs the user into the waitlist (see below mockup 2). The standard behavior of the client takes over. If there are multiple tables with the same short waitlist, the first table by alphabet will be taken. | Popup comes up telling the user "Currently all [GAME TYPE]/ [STAKE] tables are full. Would you like to join the waitlist at the table with the shortest waitlist?" When clicking on the "Get on Waitlist" button, the popup closes and the user will be taken to the table with the shortest waitlist and automatically included on the waitlist (see mockup 2). The standard behavior of the client takes over. When clicking on "No, check again." the query will be repeated. When clicking on "Cancel" the user will be taken back to where he was. |
| [GAME TYPE], e.g. Limit Hold'em | Same behavior as with [GAME TYPE]/[STAKE] tables. | Same behavior as with [GAME TYPE]/[STAKE] tables. |
| [GAME GROUP], e.g. Cash games | Same behavior as with [GAME TYPE]/[STAKE] tables. | Same behavior as with [GAME TYPE]/[STAKE] tables. |
| Avg Pot ("X or more", "X or less"), e.g. "$20 or more" | Same behavior as with [GAME TYPE]/[STAKE] tables. | Popup comes up telling the user "Currently all tables with avg. pot [SELECTED VALUE] or [SELECTED CONDITION, LESS OR MORE] are full. Would you like to join the waitlist at the table with the shortest waitlist?". When clicking on the "Get on Waitlist" button, the popup closes and the user will be taken to the |

TABLE 1-continued

| Use Case/Criteria | Behavior with Waitlist on | Behavior without Waitlist |
|---|---|---|
| | | table with the shortest waitlist and automatically included on the waitlist. The standard behavior of the client takes over. When clicking on "No, check again." the query will be repeated. When clicking on "Cancel" the user will be taken back to where he was. |
| Buy-in (STTs), e.g. 1-Table $11 | Same behavior as with [GAME TYPE]/[STAKE] tables. This behavior is applicable for Real and play Money. | Same behavior as with [GAME TYPE]/[STAKE] tables. Different message: "Currently all tables with a [BUY-IN] buy-in are full. Would you like to join the waitlist at the table with the shortest waitlist?" This behavior is applicable for Real and play Money. |
| H/hr ("X or more", "X or less"), e.g. "46 or more" | Same behavior as with [GAME TYPE]/[STAKE] tables. | Same behavior as with avg. pot tables. Different message: "Currently all tables with [SELECTED VALUE] or [SELECTED CONDITION, LESS OR MORE] H/hr are full. Would you like to join the waitlist at the table with the shortest waitlist?" |
| Seats (2, 6, 10), e.g. 6 table | Same behavior as with [GAME TYPE]/[STAKE] tables. | Same behavior as with avg. pot tables. Different message: "Currently all tables with [NUMBER] seats are full. Would you like to join the waitlist at the table with the shortest waitlist?" |
| Status in STTs (Registering, Level 1, Finished, . . .) | N/A, STTs not offering Wait list | Same behavior as with avg. pot tables. Different message: "Currently no STTs with your preferences are available at the moment. Please wait 1-2 minutes and check again, if tables are available.". When clicking on "Check again." the query will be repeated. When clicking on "Cancel" the user will be taken back to where he was. |
| Players ("X or more", "X or less"), e.g. 7 players | Same behavior as with [GAME TYPE]/[STAKE] tables. | Same behavior as with avg. pot tables. Different message: "Currently all tables with [SELECTED VALUE] or [SELECTED CONDITION, LESS OR MORE] players are full. Would you like to join the waitlist at the table with the shortest waitlist?" |

For combinations of above criteria, if the user uses a combination of criteria for auto-seating and does not get any free tables, the system may loosen the above criteria one by one in a pre-determined order and check again for availability.

If a free table fitting the exact filter of a user is found, the user will be taken to the table. If more then one table fitting the exact filter of a user is found, then a random selection may be used to pick the table. After above selection criteria have been run through and a table been found, the table will be directly opened. Even if issues arise during sitting down, the table should be open to give the user more incentive to proceed towards taking a seat. An immediate check of proper login information or sufficient balance could be done when the user triggers the direct or AutoSeat Favorite, but is not chosen as it is deemed to be more important to open the table and with this give the user a graphic incentive to proceed until he sites down.

To buy-in 74 for Direct Favorites the user will take over to sit down (i.e. buy-in manually). For the AutoSeat feature, the following three-step seat-taking procedure may be triggered.

Step 1: Logged in? If the user is not logged in yet, he will get the login dialogue for login. After successful login the user will automatically get seated. In case the user has either Auto-Login activated and/or "Remember me," the login will be done automatically by the system, so the user does not have to.

Step 2: Play Money vs. Real Money user. If the system detects a Play Money user trying to log into a Real Money game, the standard handling is being triggered, of a popup being displayed to the user.

Figure 8:
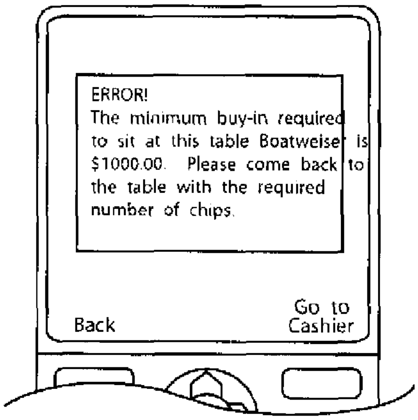
FIG. 8 is a screen shot of an error message that a user may see when attempting to access a table with insufficient funds.

Step 3: Buy-in. There may be three or more different buy-in criteria, including "Minimum buy-in," "Normal buy-in/Full balance," or "Fixed Buy-in/Tournament." If the user does not have enough money in his account to meet the minimum buy-in criteria, an error message will be triggered, as seen in FIG. 8.

After that popup, the buy-in window will open and the user would be required to go to the Cashier and increase his balance. In case the user selected the Minimum Buy-In option, and he has the according amount in his account, he will get seated properly, the minimum buy-in deducted from his balance and added to the table and the user may start playing.

For the "Normal buy-in/full balance" option, if the user does not have the specified buy-in amount but at least the minimum buy-in, a popup will appear with the message "You have [USER'S BALANCE] in your account. Please specify how much you want to take to the table." When clicking on OK the user may be taken to the buy-in dialogue where he may specify his buy-in. After that popup the buy-in window will open and the user would be required to go to the Cashier and increase his balance.

For the "Fixed buy-in (tournaments)" option, in the user will be seated, if he has sufficient funds in his account. In case he does not, a popup may appear: "You do not have sufficient funds in your account. Please come back with the appropriate number of chips." When clicking on OK the user will get directed to the buy-in dialogue where he can go to the cashier.

To sit down 75, the user may have selected a refiner "Players per seats" which may refine the search based on the number of seated players at a given table taken as a ratio of the total number of seats at the table. Possible criteria for this refiner are: "Ratio=X," "X or more," or "X or less."

With tournaments (especially Sit-and-Go tournaments), a concern is that even if a table is listed as available, in the time it takes a user to navigate to the table, sit down, and buy-in, the table has already been filled because of the large number of players trying to access that type of game. This may happen multiple times in succession, and the user may become frustrated and decide to refrain from playing. The AutoSeat feature will help remedy this problem.

If the status of a tournament has changed from Registering to any other status (e.g. Level 1, or first level of play), the system should automatically look for a new tournament/table. To avoid the user losing a seat while the system is seating him, the seat should be reserved by the system at the point the free seat is found.

5.4. Manage/Remove Favorites

Figure 9:
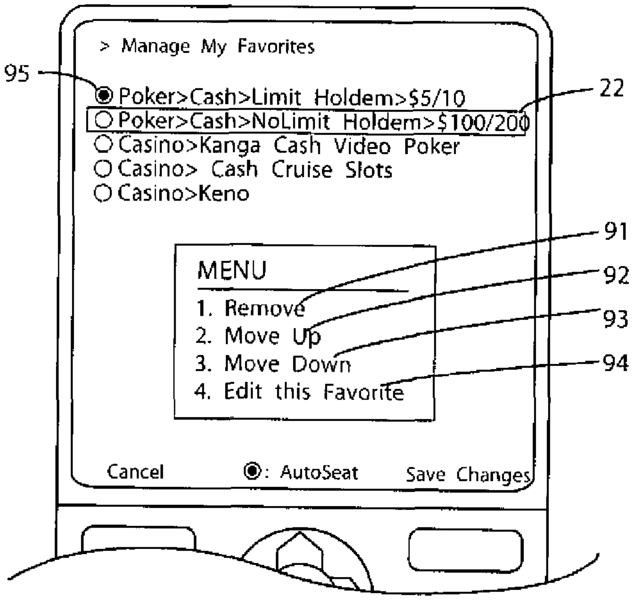
FIG. 9 is a diagram of an embodiment of the present invention, more specifically of a mobile device that incorporates the present invention wherein a user has logged-in and accessed a "Manage My Favorites" option.

FIG. 9 is an embodiment of a screen display following the selection of a "Manage My Favorites" option 52, as seen in FIG. 5. Referring to FIG. 9, a user can remove 91 a favorite, move a favorite up 92, move a favorite down 93, or edit 94 a favorite from this screen. Favorites may be organized in a hierarchy, as seen in FIG. 9, such that the system will search for preferred favorites before searching for other favorites. Favorites lower in the hierarchy may be used by the system to seat a player only if higher favorites are not available. A user may move a favorite up 92 or move a favorite down 93 to position the user's favorites in the desired order.

Furthermore, a favorite may be selected to be an "AutoSeat" favorite. This is indicated by an AutoSeat radio button 95. For example, in FIG. 9, the game "Poker>Cash>Limit Holdem>$5/10" is selected to be an AutoSeat favorite, as indicated by the AutoSeat radio button 95. In the case where are AutoSeat favorites are disabled altogether, then the AutoSeat radio button may not appear on this screen.

Figure 10:
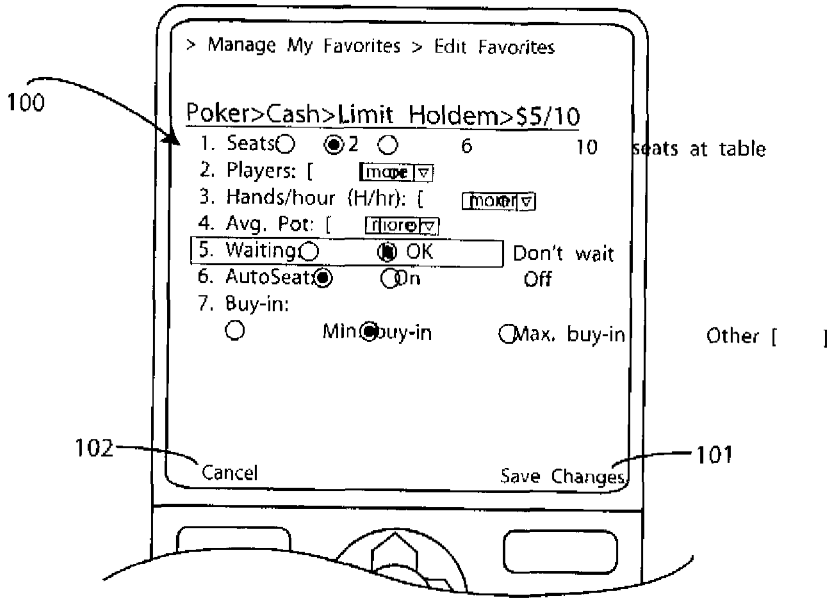
FIG. 10 is a diagram of an embodiment of the present invention, more specifically of a mobile device that incorporates the present invention wherein a user has logged-in and accessed an "Edit Favorites" option.

While a favorite is highlighted 22, the user may edit the selected favorite by the selecting Edit this Favorite 94. Choosing to edit a favorite's settings may take the user to another screen, as seen in FIG. 10. In FIG. 10, a user is editing the settings for a game "Poker>Cash>Limit Holdem>$5/10". Several editable favorites options 100 may be displayed. The favorites options that appear may be dependant on what game is selected. In embodiment shown in FIG. 10, the editable favorites options 100 are Seats, Players, Hands per hour, Average Pot, Waiting, AutoSeat, and Buy-in. Other favorites may be displayed, as would be obvious to those having ordinary skill in the art. The user can choose Save Changes 101 to save the changes made to the settings for this favorite and may be taken back to the previous screen (FIG. 9) and may edit another favorite. The user may discard changes by choosing Cancel 102.

Figure 11:
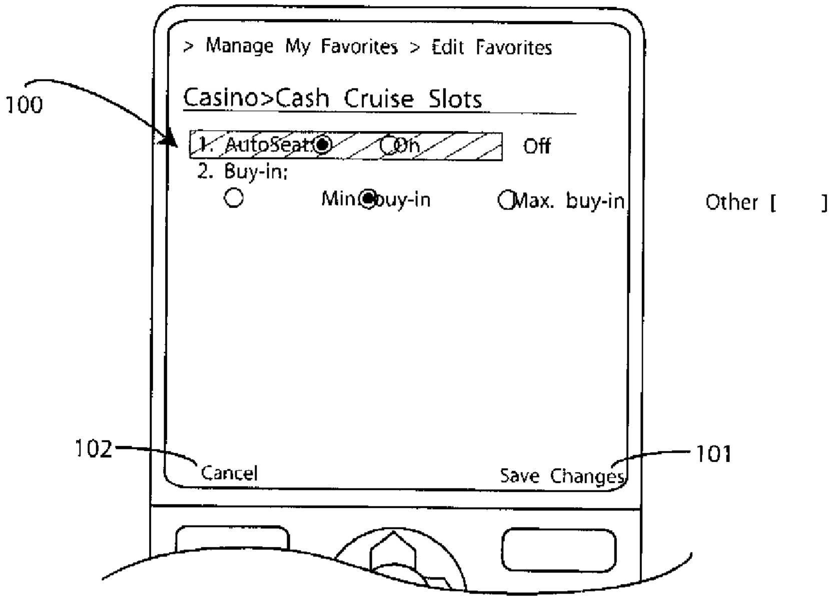
FIG. 11 is a diagram of an embodiment of the present invention, more specifically of a mobile device that incorporates the present invention wherein a user has logged-in and accessed an "Edit Favorites" option.

FIG. 11 is an embodiment of a screen following the selection of an "Edit this Favorite" option 94 (FIG. 9) but for a casino game rather than a poker game. Different favorites options 100 are shown because of the differences in games. Again, a Save Changes 101 and Cancel 102 options are available.

D. Game Selection

Referring back to FIG. 3, rather than choosing to use a favorite or AutoSeat, a player may choose to select a game manually via a "Play for Real" option 31 or a "Play for Fun" option 32.

1. Play for Real

A user may choose to play a game for real money by choosing the "Play for Real" option 31, as seen in FIG. 3. If the user is logged into a mobile game client application, like for example, a mobile poker game client application, then poker games may be accessible through the Play for Real option 31.

Furthermore, if a mobile networked gaming system wherein at least one mobile game client application lobby is associated with each of a plurality of mobile game client applications, and wherein if a given mobile game client application is installed, the associated mobile game client application lobby may be opened from one or more mobile game client applications. For example, if a mobile game client application operator operates a plurality of game client applications (i.e. a casino client, a poker client, a backgammon client, etc.), then it may be possible for a user to be able to access each of the clients via the Play for Real option 31. It may be further possible to have links available to the user to download other brand-specific mobile game client applications offered by the operator. Also, in accordance with the present invention, a mobile networked gaming system wherein when any two of said mobile game client applications are designated as client X and client Y, when either client X or client Y is installed, a corresponding lobby X or lobby Y may open from the mobile game client application, when both clients X and Y are installed, a lobby which was last open when the application was running the last time may be opened from the mobile game client application, and when no client is installed, a predetermined lobby may be opened from the mobile game client application. For example, if a user has either poker client or a casino client installed (but not both), then the corresponding lobby may be opened for the game client application. If a user has both a poker and a casino client installed, either lobby may be accessible for the game client application, preferably the last lobby that was open. Finally, if a user has neither a poker nor a casino client installed, a predetermined lobby may be open, like for example a news or events lobby.

Figure 12:
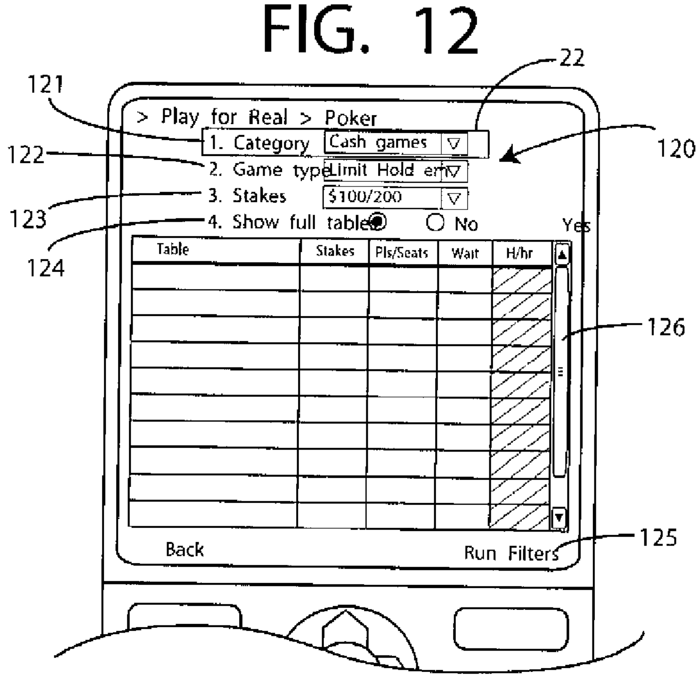
FIG. 12 is a diagram of an embodiment of the present invention, more specifically of a mobile device that incorporates the present invention wherein a user has accessed a mobile poker client lobby.
Figure 13:
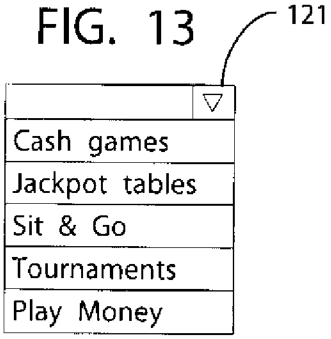
FIGS. 13-15 are screen shots filters accessible at a mobile poker client lobby.
Figure 14:
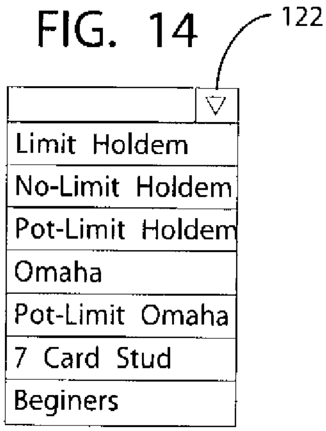
Figure 15:
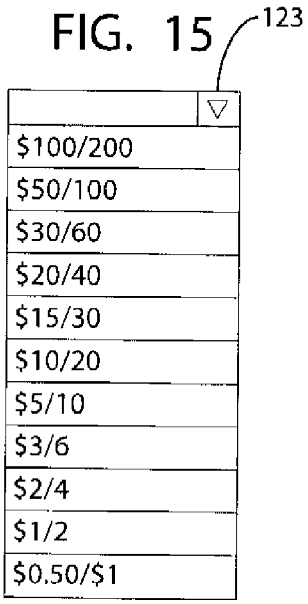

Referring to FIG. 12, a poker lobby is shown following a user selection of a Play for Real option 31 of a mobile poker client application. A mobile poker lobby may have the same characteristics as a brand-specific PC-based client poker lobby with the difference of the dimensions. The same error case handling can be applied as well. For easier access to the tables of choice in the limited dimensions of the mobile gaming device, filters 120 may be used. A top-level filter 121 may contain broad categories such as: Cash Games, Jackpot Tables, Sit & Go, Tournaments, Tournament Events, or Play for Free, as shown in FIG. 13. Second level navigation items 122 match the secondary navigation in the brand-specific client poker lobby, e.g. the "Cash Games" top-level section may include Hold'em, Omaha, Stud and other games, as shown in FIG. 14. A third level 123 may contain the stakes as a refiner, e.g. All, $5/10, $10/20, etc, as shown in FIG. 15.

When changing the filters, the selection change may be processed requested immediately; thus a submit command (i.e. a "Run Filters" button 125 (FIG. 12) may not be required). The order of filtering is from first to third level descending, i.e. the top-level selection influences the second level, which influences the third level, which influences any other levels there may be. If the user changes the top-level navigation 121, both second level navigation items 122 and third level 123 may change. Initial selection in the Poker lobby may be: Cash Games>Limit Hold'em>$100/$200.

Referring to FIG. 12, vertical or horizontal scroll bars 126 will enable the user to quickly scroll up and down the table list and also to the right (via horizontal scroll bar, not shown), in case his window is not wide enough to display all columns. Default position of the list window will be top left of the list. The scroll bar 126 will have the same functionality as other standard scrollbars. In case the table list is shorter then the window, the scroll bar 126 vanishes.

There may be a full table filter 124: a radio button will let the user hide or show full tables. By default the button may be pressed and say "Show full tables? NO". In this case, full tables are being hidden. In general, all of the same filters as available in the main client should also be possible in a mobile networked gaming client application.

Figure 16:
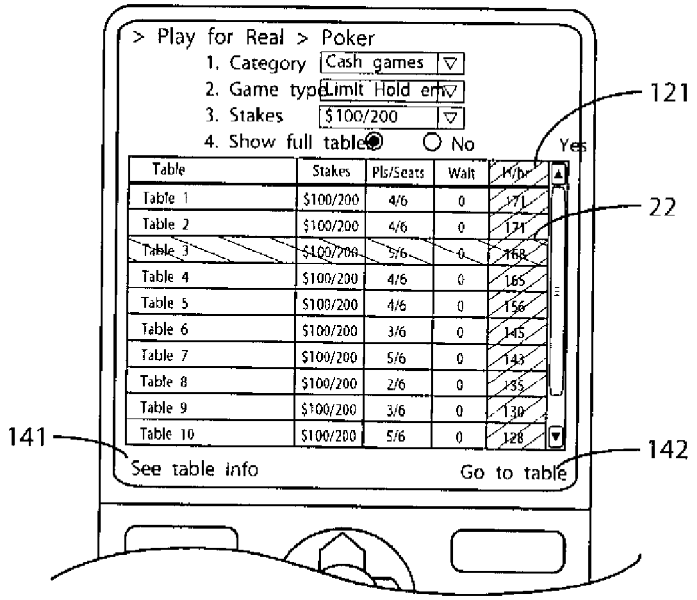
FIG. 16 is a diagram of an embodiment of the present invention, more specifically of a mobile device that incorporates the present invention wherein a user has accessed a mobile poker client lobby and has select a specific game table.

If there are no results available in the table list, the table list may be empty, just showing one entry messaging "No tables available. Use the filters to find other games or check back at a later point. If tables exist, but are not being shown due to an active full table filter, the full table filter button 124 deactivates and the tables will be shown, even if full. The button setting is remembered and as soon as the user changes the selection, the button jumps back to its settings. All fields/columns can sort the table list the same way as currently a poker client lobby does. Sorting will be ascending/descending fashion, following the same behavior a poker client lobby has. As seen in FIG. 16, the column "H/hr" 140 (hands per hour) has been selected and the available tables are sorted in descending order relative to hands per hour. Selecting the H/hr 140 again may change the sorting for descending to ascending order.

Figure 17:
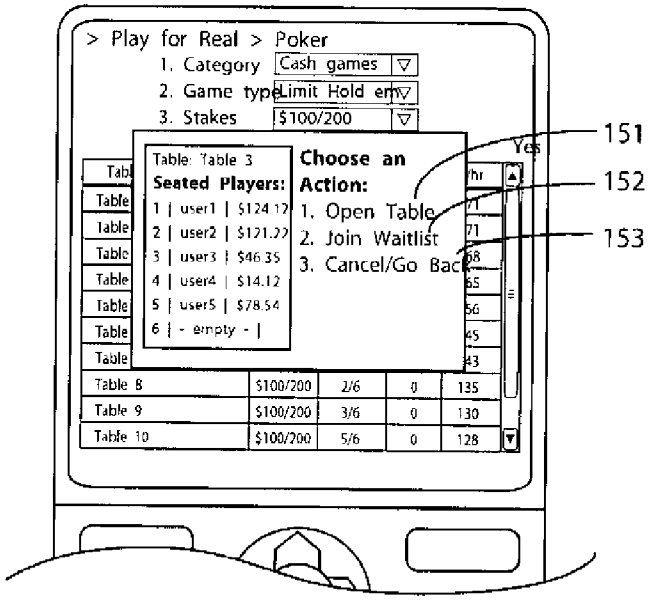
FIG. 17 is a diagram of an embodiment of the present invention, more specifically of a mobile device that incorporates the present invention wherein a user has accessed a mobile poker client lobby and has select to see more information about a specific game table.

Referring to FIG. 16, a user may use the keys of the mobile device to move the highlighted 22 table up or down. When a table is highlighted 22, a "See Table Info" button 141 may appear. Also, a "Go To Table" button 142 may appear. Selecting the See Table Info button 141 may open a new "window" visible as if above the other text on the screen, as seen in FIG. 17. This new window may contain more detailed information about the selected table, such as the usernames of the seated players and how much money each has at the table. Several options may be available, including "Open Table" 151, "Join Waitlist" 152, or "Cancel/Go Back" 153. If a user highlighted a table, which he is already sitting at, the "Open" button 123 will de-activate. The "Waitlist" button 124 lets the user join a waitlist for a table.

Referring back to FIG. 16, the rules defined for the "Go to Table" button 142 apply to the "Open Table" option in FIG. 17 in the information menu. Selecting either "Open" button will cause the user to enter the table. In case he is already on the table (means, the table is open), playing or not, the table will become active, i.e. jumping in the front of the screen. Clicking on the "Join Waitlist" option 152 (FIG. 17) the user will enter the table's waitlist. In case he is already on the waitlist, the button will be inactive and a small icon will be messaging the fact and he will have the option to unjoin.

Navigation, selection, and access to the table happens in the mobile gaming application lobby. From there the table picks up the process. This implies the fact that a poker table does not need a poker client open to play. After the user double-clicked or opened a table, the table opens up so the user can watch the table. If the user wants to take a seat, buy-in, and any other features are being taken over by the existing table functionality. As is the present case, at this point the blocked country list will be enforced.

Figure 18:
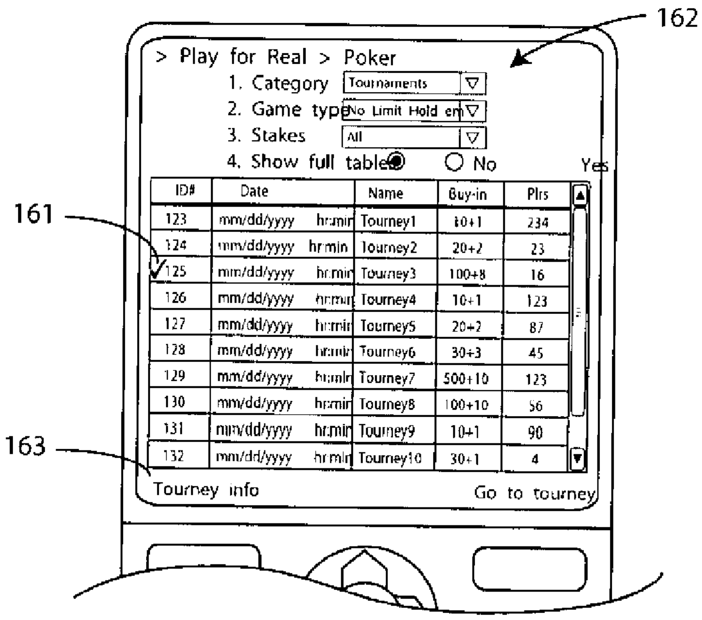
FIG. 18 is a diagram of an embodiment of the present invention, more specifically of a mobile device that incorporates the present invention wherein a user has accessed a mobile poker client lobby and has registered for a poker tournament.
Figure 19:
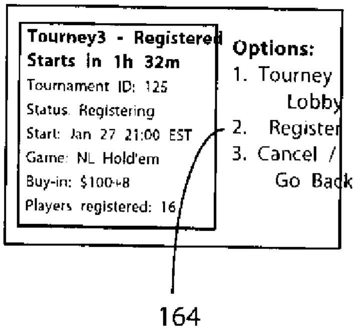
FIG. 19 is a screen shot of an embodiment of a "More Info" screen for a poker tournament.

Referring to FIGS. 18-19, for tournament poker tables, the fields "ID", "Date", "Name", "Game", "Buy-In", or "Plr" (Player) may be displayed in the table list. Tournaments which are not accessible anymore to the user may display in grey color, or not at all. A tournament may also be listed with a grey color if it is either a full tournament or a tournament that has already started and does not offer a late buy-in. Tournaments for which the user has already registered for may be displayed in bold and feature an icon messaging confirmation and registration, like a checkmark 161.

Tournament filter buttons 162 may allow let the user to hide or show specific tables. These filter buttons operate similarly to those of other poker filters.

All fields in the table list can sort the table the same way as currently a poker client lobby does. Sorting will be ascending/descending fashion, but following the same behavior a poker client lobby has.

Referring to FIG. 18, selecting a "Tourney info" option 162 for a specific tournament may open a new window, like that shown in FIG. 19. This new window may show more detailed tournament information, such as the tournament ID, the tournament's status, its start time, game type, buy-in, or the number of players registered or playing.

Also a "Register" button 164 lets users register for a tournament after selecting it. If a user highlighted a tourney, which he is already registered for, the "Register" button 152 will de-activate and a small icon checkmark 161 may be messaging the fact in the table list.

Figure 20:
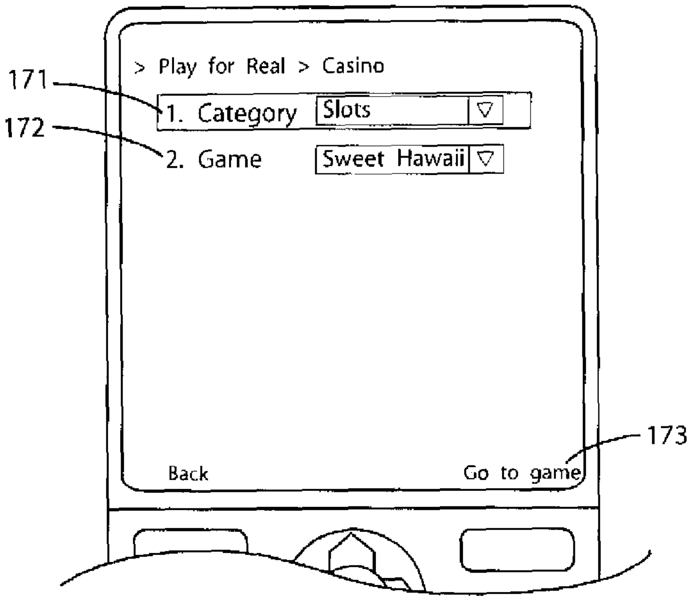
FIG. 20 is a diagram of an embodiment of the present invention, more specifically of a mobile device that incorporates the present invention wherein a user has accessed a mobile casino client lobby.
Figure 21:
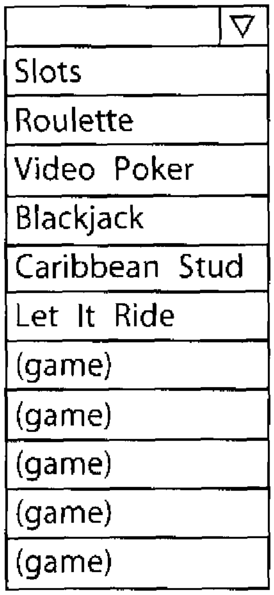
FIGS. 21-22 are screen shots of filters accessible at a mobile casino client lobby.
Figure 22:
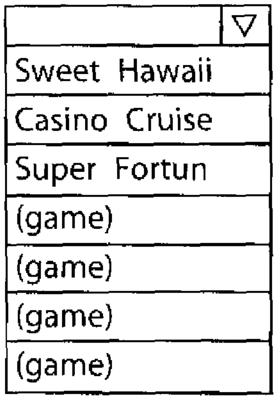

Referring to FIG. 20, a user may choose to play on a different mobile client application offered by the operator, like, for example a mobile casino client. FIG. 20 shows a mobile casino client lobby. For easier access to the games of choice in the limited dimensions of a mobile device, filters along the current casino navigation are used. The top-level navigation 171 may contain such general categories of games as: Slots, Roulette, Video Poker, Blackjack, Caribbean Stud, Let It Ride, etc, as shown in FIG. 21. The second level navigation 172 may contain the actual games, e.g. Sweet Hawaii, Cash Cruise, Super Fortune Wheel, etc, as shown in FIG. 22. When changing the filters, the selection change may be requested immediately; i.e. a submit button is not required. The default filter values may be the first selection in case the user never changed the selection before. If the user changed a selection before, the default value may be the previous selection, when the user comes back to that drop-down.

2. Play for Fun

Referring to FIG. 3, a user may choose a "Play for Fun" option 32, rather than a "Play for Real" option 31. Choosing a "Play for Fun" option may give the user the same general choices for game play, except all the games will be for play money. As is generally the case with play money gaming applications, when a user exhausts all of his play money, more is deposited into the user's account at no charge.

E. Messaging

The mobile networked gaming system of the present invention wherein the server is capable of sending information to the mobile game client application. This information may include an informative message or a promotional message from the game server to users of a mobile game client application. The messages sent to the game client application may be simply informational, for example "Tournament X, for which you are REGISTERED, is scheduled to start in 5 minutes." Also, the messages may be promotional, for example "25% deposit bonus if you reload your account within 2 weeks." The information (i.e. messages) sent from the server to the mobile game client application may be in the form of pop-ups that appear on the screen of the mobile device, similar to the message shown in FIG. 16*b*. The pop-ups may appear for several seconds and then disappear. There may also be an section in the "My Account" option 38 (see, FIG. 3), wherein a user may view a log of messages received from the server.

While the foregoing written description of the invention enables one of ordinary skill to make and use what is considered presently to be the best mode thereof, those of ordinary skill will understand and appreciate the existence of variations, combinations, and equivalents of the specific exemplary embodiment and method herein. The invention should therefore not be limited by the above described embodiment and method, but by all embodiments and methods within the scope and spirit of the invention as claimed.

The invention claimed is:

1. A mobile networked gaming system operable on a mobile phone or wireless device wherein a mobile game client application connects a player to a server, said mobile networked gaming system comprising:

at least one game server;

at least one game table hosted on said game server;

said game server providing game operations and displays for transmission to said mobile game client application;

said displays including at least one lobby screen display from which a player can manually request to be seated at one or more of a plurality of virtual game positions in one or more of a plurality of multi-player or single-player games; and a selectable automated seating option for automatically seating a player at one or more of a plurality of virtual game positions, wherein the selectable automated seating option is configured such that a player bypasses said lobby screen and is directly seated when the player logs-in to the mobile networked gaming system without any action by the player subsequent to logging in.

2. A mobile networked gaming system according to claim 1, wherein said automated seating option of said mobile game client application is capable of receiving and storing personal preference information, comprising a game category, a specific game type, stakes, and an amount of money to be taken from a player's account when seating a player, and for seating a player at a table in accordance with said stored personal preference information.

3. A mobile networked gaming system according to claim 1, wherein at least one mobile game client application lobby is associated with each of a plurality of mobile game client applications, and wherein if a given mobile game client application is installed, the associated mobile game client application lobby is openable from one or more mobile game client applications.

4. A mobile networked gaming system according to claim 1, wherein said at least one lobby screen display is accessible by the mobile game client application without a player logging-in to the mobile game client application.

5. A mobile networked gaming system according to claim 1, further comprising a plurality of mobile game client applications, wherein when any two of said mobile game client applications are designated as client X and client Y, when either client X or client Y is installed, a corresponding lobby X or lobby Y may open from the mobile game client application, when both clients X and Y are installed, a lobby which was last open when the application was running the last time may be opened from the mobile game client application, and when no client is installed, a predetermined lobby may be opened from the mobile game client application.

6. A mobile networked gaming system according to claim 1, wherein said automated seating option of said mobile game client application is further selectable by the mobile networked gaming system, whereby personal gaming history, comprising a game category, a specific game type, stakes, or an amount of money that a player commonly plays, may be recorded by the mobile networked gaming system and a player may be taken directly to a table, upon logging into the system, in accordance with the recorded personal gaming history of a player.

7. A mobile networked gaming system according to claim 6, wherein based on the personal gaming history of a player, some amount of money is taken from a player's account when seating a player, such that the player is seated with said amount of money usable for game play.

8. A mobile networked gaming system according to claim 1, wherein the server is capable of sending information to the mobile game client application.

9. A networked gaming system according to claim 8, wherein said information may include an informative message or a promotional message from the game server to users of a mobile game client application.

10. A mobile networked gaming system operable on a mobile phone or wireless device wherein a mobile game client application connects a player to a server, said mobile networked gaming system comprising:

at least one game server;

at least one game table hosted on said game server;

said game server providing game operations and displays for transmission to said mobile game client application;

said displays including at least one lobby screen display configured to display a plurality of tables and from which a player can manually request to be seated at one or more of a plurality of virtual game positions in one or more of a plurality of multi-player or single-player games; and a selectable automated seating option for automatically seating a player at one or more of a plurality of virtual game positions, wherein the selectable automated seating option is configured such that a player bypasses said lobby screen after logging-in to the mobile networked gaming system.

11. A mobile networked gaming system according to claim 10, wherein said automated seating option of said mobile game client application is capable of receiving and storing personal preference information, comprising a game category, a specific game type, stakes, and an amount of money to be taken from a player's account when seating a player, and for seating a player at a table in accordance with said stored personal preference information.

12. A mobile networked gaming system according to claim 10, wherein at least one mobile game client application lobby is associated with each of a plurality of mobile game client applications, and wherein if a given mobile game client application is installed, the associated mobile game client application lobby is openable from one or more mobile game client applications.

13. A mobile networked gaming system according to claim 10, wherein said at least one lobby screen display is accessible by the mobile game client application without a player logging-in to the mobile game client application.

14. A mobile networked gaming system according to claim 1, further comprising a plurality of mobile game client applications, wherein when any two of said mobile game client applications are designated as client X and client Y, when either client X or client Y is installed, a corresponding lobby X or lobby Y may open from the mobile game client application, when both clients X and Y are installed, a lobby which was last open when the application was running the last time may be opened from the mobile game client application, and when no client is installed, a predetermined lobby may be opened from the mobile game client application.

15. A mobile networked gaming system according to claim 1, wherein said automated seating option of said mobile game client application is further selectable by the mobile networked gaming system, whereby personal gaming history, comprising a game category, a specific game type, stakes, or an amount of money that a player commonly plays, may be recorded by the mobile networked gaming system and a player may be taken directly to a table, upon logging into the system, in accordance with the recorded personal gaming history of a player.

16. A mobile networked gaming system according to claim 6, wherein based on the personal gaming history of a player, some amount of money is taken from a player's account when seating a player, such that the player is seated with said amount of money usable for game play.

17. A mobile networked gaming system according to claim 1, wherein the server is capable of sending information to the mobile game client application.

18. A networked gaming system according to claim 8, wherein said information may include an informative message or a promotional message from the game server to users of a mobile game client application.

* * * * *